Patented Dec. 4, 1934

UNITED STATES PATENT OFFICE 1,982,985

PROCESS OF PREPARING HYDROGENATED AMINES

Otto Ernst and Ludwig Mack, Frankfort-on-the-Main-Hochst, Germany, assignors to I. G. Farbenindustrie Aktiengesellschaft, Frankfort-on-the-Main, Germany, a corporation of Germany No Drawing. Application February 12, 1929, Serial No. 339,488. In Germany February 18, 1928

12 Claims. (Cl. 260—128)

The present invention relates to a process of preparing compounds of the following constitution:

wherein one X may stand for hydrogen, alkyl, aralkyl, aryl or hydroaryl and the other X for alkyl, aralkyl, aryl or hydroaryl.

We have found that amines of the above described constitution can be prepared by causing aliphatic, hydroaromatic or aromatic alcohols on the one hand to act upon amines or ammonia on the other hand in the presence of a catalyst suitable for effecting the hydrogenation, especially of finely divided reduced nickel, whereby water is split off and the hydrogenated amines are obtained. Instead of alcohols there can be transformed in like manner phenols into amines if hydrogen is present. The reaction may be carried out either in the gaseous phase or in the liquid phase at a raised temperature and with or without applying pressure. That the reaction takes place by way of the alcohols, as intermediate stage, is evident from the fact that in the absence of free hydrogen it is not possible to prepare in above described manner diphenylamine from phenol and aniline, but diphenylamine can be prepared when hydrogen is present by hydrogenation, elimination of water and subsequent dehydrogenation of the dicyclohexylamine or cyclohexylaniline obtained.

The following examples illustrate our invention, but they are not intended to limit it thereto, the parts being by weight:

1. A mixture of equal molecular proportions of aniline and phenol—the aniline being substantially free from sulfur—is evaporated at a temperature of 225° C. in a current of hydrogen suitable for hydrogenating purposes and then conducted over 10 liters of a nickel-pumice stone contact at a temperature of 185° C. The pumice stone contact which contains 8 per cent of nickel is prepared by applying basic nickel carbonate upon pumice stone and reducing the mass at a temperature between 320° C. and 340° C. The quantity of the aforementioned mixture thus transmitted per liter of contact volume amounts to 30–45 grams, the velocity of the hydrogen to 270 liters per hour and per liter of contact volume. A reaction product is thus obtained consisting of 40–60 per cent of dicyclohexylamine $C_6H_{11}NHC_6H_{11}$. The dicyclohexylamine is isolated from the other substances contained therein by fractional distillation at normal pressure and finally in a vacuum. The by-products formed during the reaction must not be returned into the process. These by-products are the reaction-water, some methane and ammonia, finally some benzene to the amount of 1 to 2 per cent of the crude product obtained and a residue left after the distillation amounting to about 2 per cent. The parent material and its hydrogenation products, among which also cyclohexylamine, can easily be further transformed into dicyclohexylamine by the same contact process and the hydrogen can, in like manner, be returned into the process.

The ranges of temperature to be applied during the reaction are between about 100° C. and 300° C.; the best results are generally obtained at a temperature of about 185° C.

2. A mixture of molecular proportions of cyclohexanol and aniline is gasified in a current of hydrogen which is more than sufficient for the hydrogenation of the aniline and the gaseous mixture is conducted, at a temperature of between 180° C. and 190° C. over a reduced nickel contact applied on pumice stone. A mixture of dicyclohexylamine and cyclohexylamine is thus obtained.

3. A mixture of cyclohexanol vapor and an excess of ammonia is conducted over a nickel contact at a temperature of between 180° C. and 190° C. Thus a mixture of dicyclohexylamine and cyclohexylamine is obtained.

4. Phenol is evaporated in a mixture of about 80 per cent of hydrogen and about 20 per cent of ammonia, whereupon the mixture thus produced is conducted at a temperature of about 180° C. over a nickel catalyst which has been prepared by applying basic nickel carbonate with an addition of some water glass upon pumice stone and subsequently reducing the mass in a current of hydrogen at a temperature of about 320° C. The velocity of the current amounts to about 10 liters of the mixture of hydrogen, ammonia and phenol vapor per minute and per liter of contact volume with a charge of 20–30 grams of phenol per hour and per liter of contact volume. The gases leaving the reaction chamber are then cooled whereupon there is obtained in an excellent yield a mixture chiefly containing cyclohexylamine besides some dicyclohexylamine and which after being previously dried can be separated into its constituents by fractional distillation. The mixture of hydrogen and ammonia which leaves the cooler is again conducted into the evaporator by means of a circulation pump after the consumed quantities of hydrogen and ammonia have been previously replaced.

5. Crude cresol (a mixture of ortho-, meta- and para-cresol) which has been freed from any sulfur compounds, is conducted in the presence of gaseous ammonia (as described in Example 4), over a nickel catalyst, which has been prepared by grinding together 100 parts of basic nickel carbonate and 40 parts of aluminium phosphate and applying this mixture upon 1000 parts by volume of granular pumice stone by means of 100 parts of water-glass solution and reducing the mass in a current of hydrogen at a temperature of about 320° C. When the reaction gases have cooled, there is obtained with good yield a mixture which for the most part consists of primary hydroaromatic amines.

6. To a mixture of equal molecular proportions of phenol and aniline is added about 5 per cent of its weight of nickel powder which has been freshly reduced from nickel carbonate. This mixture is agitated at a temperature of between 170° C. and 200° C. in a revolving autoclave under hydrogen pressure until there can no more be observed any diminution of the hydrogen pressure. The reaction product which consists of cyclohexylamine and dicyclohexylamine can be separated from the nickel by decanting it; the nickel can then be used for further reactions.

7. Normal butyl alcohol is evaporated in a brisk current of an excess of ammonia. The mixture is conducted at a temperature of 300° C. over a pumice stone contact upon which reduced nickel has been applied (see Example 1). The butylamine contained in the reaction mixture is isolated in the usual manner.

8. A mixture of aniline and an excess of ethyl alcohol is gasified and conducted at a temperature of between 185° C. and 200° C. over a contact made of reduced nickel and pumice stone. The reaction product when freed from the unaltered parent material chiefly consists of ethyl aniline and, besides, of a trace of diethyl aniline.

9. A mixture of 148 g. of anhydrous cyclohexylamine and 107 g. of anhydrous alcohol is evaporated and conducted after dilution with hydrogen or nitrogen at a temperature of between 185° C. and 200° C. in a slow current over a contact made of reduced nickel and pumice stone. There is obtained for the most part monoethylhexylamine besides some diethyl compound.

We claim:

1. The process of preparing a mixture of dicyclohexylamine and cyclohexylamine which comprises hydrogenating phenol and aniline and simultaneously condensing the compounds thus obtained in the presence of a nickel metal catalyst known to promote hydrogenation reactions at a temperature between 100° C. and 300° C.

2. The process of preparing a mixture of dicyclohexylamine and cyclohexylamine which comprises hydrogenating phenol and aniline and simultaneously condensing the compounds thus obtained by conducting the vapors of aniline and phenol together with hydrogen over a nickel metal catalyst known to promote hydrogenation reactions at a temperature of about 185° C.

3. The process which comprises condensing cyclohexanol with aniline in the presence of a nickel metal catalyst known to promote hydrogenation reactions.

4. The process for the preparation of secondary amines which comprises heating an alcohol with a primary aromatic amine of the benzene series in the presence of a metallic hydrogenation catalyst, at a temperature between about 100° C. and about 300° C.

5. The process for the preparation of secondary amines which comprises heating ethyl alcohol with a primary aromatic amine of the benzene series in the presence of metallic nickel at about 190° C.

6. The process for the preparation of secondary amines which comprises heating cyclohexanol with aniline in the presence of metallic nickel at temperatures between about 180° C. and about 190° C.

7. Process for the production of cyclohexylamine and dicyclohexylamine which comprises heating cyclohexanol with ammonia in the presence of metallic nickel at a temperature of about 190° C.

8. A process for the preparation of amines, consisting in heating an alcohol with ammonia, in the presence of a metallic hydrogenation catalyst.

9. A process for the preparation of amines, consisting in heating an alcohol with ammonia, in the presence of a metallic hydrogenation catalyst, at a temperature comprised between 100° C. and 250° C.

10. In a process of preparing amines by condensing a compound of the following constitution:

wherein X may stand for hydrogen, an aliphatic, aromatic, or hydroaromatic radical with an alcohol, the step which comprises carrying out the reaction at a temperature between 100° C. and 300° C. in the presence of a catalyst known to promote hydrogenation reactions.

11. In a process of preparing amines by condensing a compound of the following constitution:

wherein X may stand for hydrogen, an aliphatic, aromatic, or hydroaromatic radical with a cyclic alcohol, the step which comprises carrying out the reaction at a temperature between 100° C. and 300° C. in the presence of a catalyst known to promote hydrogenation reactions.

12. In a process of preparing amines by hydrogenating a phenol and simultaneously condensing the alcohol thus obtained with a compound of the following constitution:

wherein X may stand for hydrogen, an aliphatic, aromatic or hydroaromatic radical, the step which comprises carrying out the reaction in the presence of a nickel catalyst known to promote hydrogenation reactions at a temperature between 100° C. and 300° C.

OTTO ERNST.
LUDWIG MACK.